Patented Feb. 1, 1927.

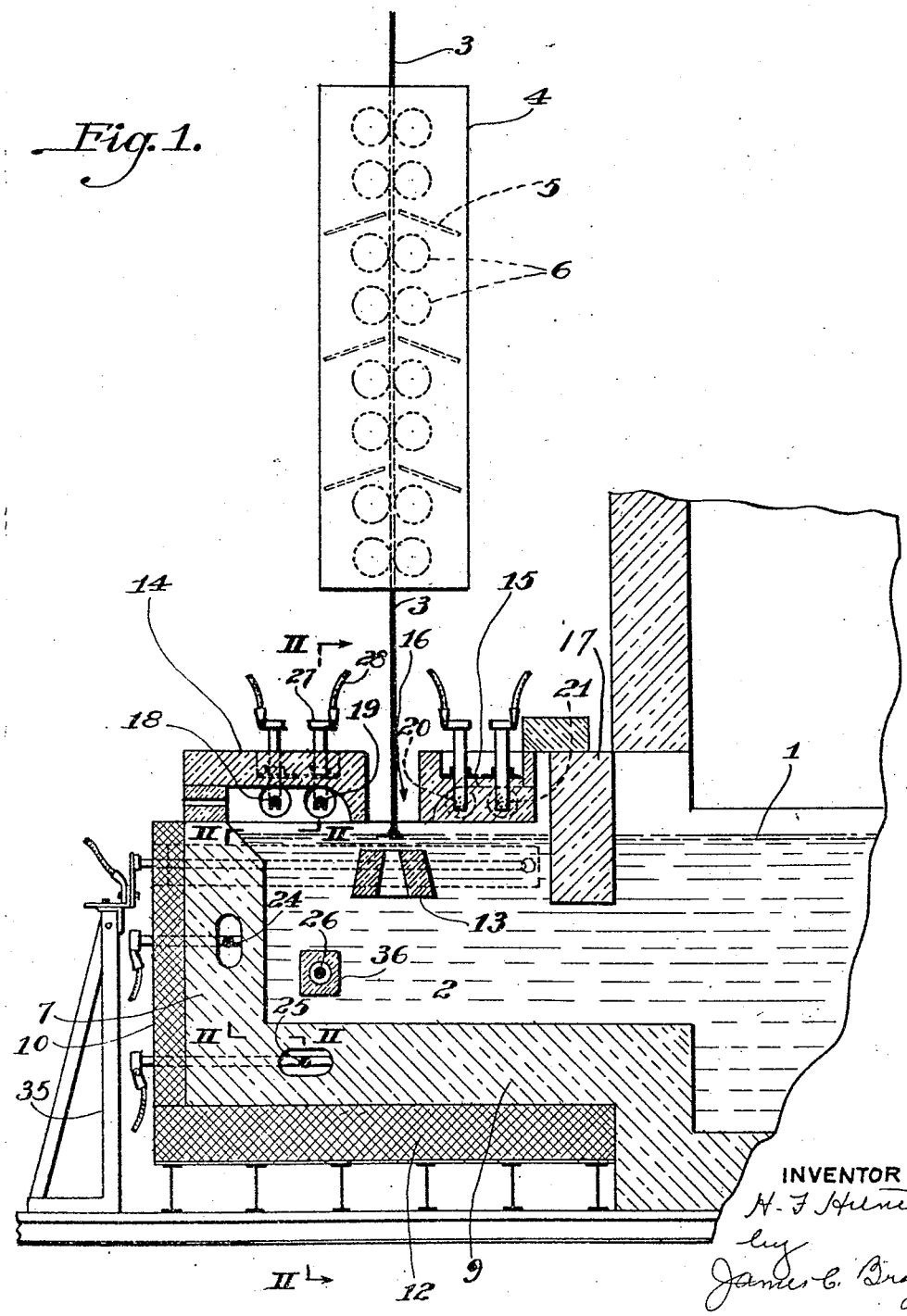

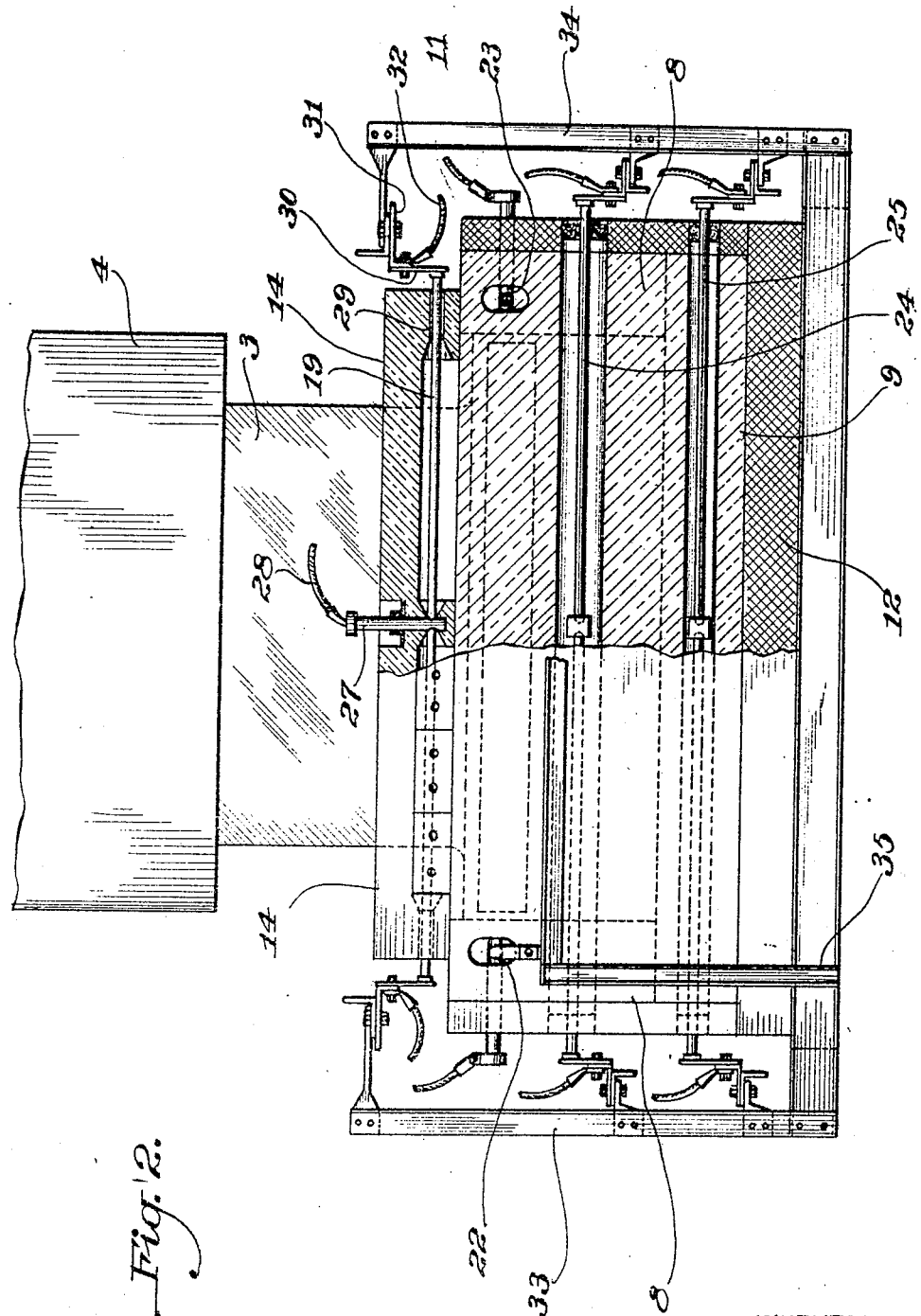

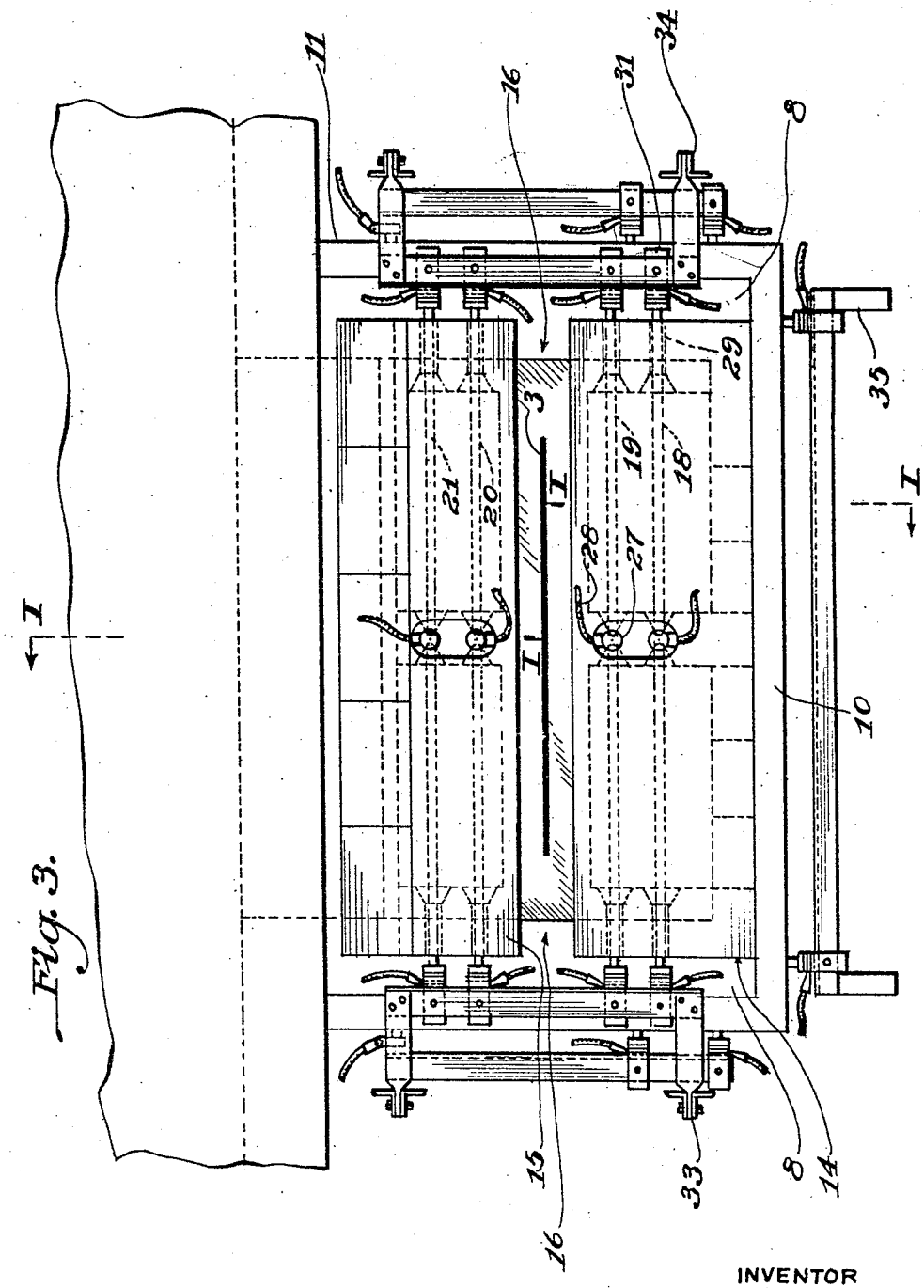

1,615,842

UNITED STATES PATENT OFFICE.

HARRY F. HITNER, OF PITTSBURGH, PENNSYLVANIA, ASSIGNOR TO PITTSBURGH PLATE GLASS COMPANY, A CORPORATION OF PENNSYLVANIA.

APPARATUS FOR MAKING SHEET GLASS.

Application filed August 20, 1925. Serial No. 51,327.

The invention relates to apparatus for making glass in a continuous sheet or ribbon preferably by a drawing operation from a body of molten glass. It has for its primary objects the provision of improved means for governing the temperature of the body of glass from which the sheet is generated, so that such temperature is under accurate control, and may be maintained constant and uniform on the two sides of the sheet. One embodiment of the invention is illustrated in the accompanying drawings wherein:

Figure 1 is a vertical section through the apparatus on the line I—I—I—I of Fig. 3. Fig. 2 is a partial front elevation and partial vertical section on the line II—II—II—II—II of Fig. 1. And Fig. 3 is a plan view of the apparatus.

Referring to the drawings, 1 is the end of a melting tank preferably of the regenerator type having a forehearth or kiln from which a continuous sheet of glass 3 is to be drawn. Any desired form of drawing apparatus may be employed, the particular device illustrated comprising an annealing casing 4 divided into sections by means of the inclined partitions 5 and provided with a plurality of driven rolls 6 preferably covered with asbestos and yieldingly engaging the opposite sides of the glass sheet. The glass passing through the casing is gradually annealed and cooled and when it emerges at the top of the casing, it is cut into sections. This form of drawing apparatus is well known in the art and for that reason requires no extended description. The forehearth or kiln 2 comprises an end wall 7, a pair of side walls 8, 8 and a bottom wall 9 of clay surrounded by insulating walls of silocel or other similar material, such walls being designated by the reference numerals 10, 11 and 12. Mounted in the glass bath of the kiln beneath the line of generation of the sheet 3 is a refractory guide bar 13 for maintaining the locus of generation of the sheet substantially constant. The kiln is provided with a cover in the form of a pair of blocks 14 and 15 spaced apart to provide the opening 16 through which the sheet is drawn. A block 17 is employed between the melting tank and the kiln, such block extending down into the glass bath and serving as a skimming device and also as a cut-off for preventing the hot gases in the melting furnace affecting the glass bath in the kiln from which the sheet is drawn, it being desirable to eliminate in so far as is possible any variations in the temperature conditions of the kiln incident to changes in temperature conditions or atmospheric conditions in the melting tank.

A plurality of sets of heating elements are employed for giving control of the temperature of the glass bath in the kiln, all of such elements being in the form of resistance rods which are heated to incandescence by the passage of current therethrough. As illustrated in the particular design of the drawings, there are four of these elements carried by the top members 14 and 15 of the furnace and one each of such members carried by the front, side and bottom walls of the kiln. Still another element is carried by a refractory tube extending transversely of the kiln adjacent its outer, lower corner. These heating elements or rods may be composed of any one of the well-known refractory resistance compositions, the one preferably used being composed largely of carborundum and known by the trade name of "globar". These heating elements are designated by the reference numerals 18, 19, 20, 21, 22, 23, 24, 25 and 26, and in each case, the element is made in two parts with the adjacent inner ends suitably supported, as a bar of this material of length sufficient to extend from one side of the furnace to the other requires support intermediate its ends.

The elements 18, 19, 20 and 21 carried by the top members 14 and 15 heat the glass directly by radiation as they are relatively close to the surface thereof and also heat it by reflection from the lower faces of the members 14 and 15. These heating elements give a very direct control of the temperature of the glass on the two sides of the sheet 3, so that by properly regulating the current, the glass bath on the opposite sides of the sheet may be brought to uniform temperature, thus promoting the formation of a flat sheet which is free from strain. The sections of the bars, as for instance, the bar 19 have their ends supported in the post 27 which has its side walls recessed to receive the ends of the sections and has its upper end connected to one of the electric terminals 28. This post is preferably made of a metal composition having high heat resisting qualities, such as a nickel chromium composition or a nickel iron composition. A composition suitable for this purpose is known by the trade name of "ascaloy" and contains about 75 per cent of iron and 25 per cent of chromium. At their outer ends, the sections of the bar 19 extends slidably through the depending flanges of the top member 14, as indicated at 29, so that the ends are free to move in and out as the bar contracts and expands due to varying temperature conditions. The contact is preferably made with the outer ends of the sections of the resistance bar 16 by means of spring plates 30 supported by brackets 31 and connected to terminals 32. By this arrangement current may be supplied to the outer ends of the sections from which it passes through to the post 27 and out through the terminal 28. The supporting brackets for the terminals are preferably carried by the vertical sections 33, 34, 35, etc. which are suitably connected by tie members and braces as illustrated. The resistance elements 22, 23 and 24 lie in passages extending through the walls of the furnace and so arranged that the surfaces of the bars are out of contact with the surrounding walls of the passages. These bars are all made up of two pieces as described in connection with the bar 19 and they are supported at their inner ends by "ascaloy" posts and connected to suitable terminals at their outer ends, as illustrated, and in the same manner as described in connection with the bar 19. These heating elements 22, 23, 24 and 25 are less direct in their effect upon the glass than the elements 18, 19, 20 and 21, but at the same time exert a substantial influence upon the glass and tend to prevent devitrification of the layer of glass lying close to the side walls of the kiln and which would otherwise have a temperature substantially lower than that of the body of glass in the kiln due to the conduction of the heat from this layer of glass by the clay walls.

The heating element 26 is also similar in construction and support to that heretofore described in connection with the bar 19 and extends transversely of the kiln from one side to the other. It is carried upon the interior of the hollow refractory member or tile 36. This resistance element exercises a powerful heating effect upon the body of glass in the tank and tends to prevent any devitrification in the corner of the tank which is most liable to be subject to this action due to its remoteness from the other heating elements and to the fact that there is little, if any, circulation at this point tending to distribute the stagnant glass most liable to become devitrified. Certain advantages are involved in spacing the element 26 away from the walls of the hollow member 36. With the element 26 thus supported, it is much easier to remove and replace it than if the surrounding material were in contact with it. Furthermore, the whole member 36 is subject to cracking due to expansion and contraction and such fracture would, in most cases, crack the element 26 if the element were embedded in the member 36 with the surfaces of the two parts in contact. Taken together, the heating elements provide for a close control of the temperature of the glass in the kiln throughout, and by proper supervision and the use of temperature recording instruments, the drawing of the sheet may be conducted under temperature conditions which have been found to produce the best results, and these conditions, when once observed and determined, may be easily reproduced in the further operation of the apparatus. The fact that the forehearth is cut off from the influence of the melting tank to a large extent renders this control definite and reliable.

What I claim is:

1. The combination with container for molten glass, of heating means therefor comprising a tube of refractory material extending through the body of glass, a resistance rod extending through the tube but out of contact therewith, and means for passing a current of electricity through said rod.

2. The combination with container for molten glass, of heating means therefor comprising a tube of refractory material extending through the body of glass, a resistance rod extending through the tube but out of contact therewith, and means for passing a current of electricity through said rod, the said rod being mounted so that it is free to move endwise.

3. The combination with container for molten glass having walls of refractory material with passages therethrough, of heating means therefor comprising resistance rods extending through the passages with their surfaces spaced away from the walls of the passages, and means for passing a current of electricity through the rods.

4. The combination with container for molten glass, of side, bottom and end walls of refractory material with passages therethrough, of heating means therefor comprising resistance rods extending through the passages with their surfaces spaced away from the walls of the passages, and means for passing a current of electricity through the rods.

5. The combination with container for molten glass, having walls of refractory material with passages therethrough, of heating means therefor comprising resistance rods extending through the passages with their surfaces spaced away from the walls of the passages, and means for passing a current of electricity through the rods, each of the rods being made in two parts with supporting means at their meeting ends, and being free to move endwise.

6. The combination with container for molten glass having walls of refractory material with passages therethrough, of heating means therefor comprising resistance rods extending through the passages with their surfaces spaced away from the walls of the passages, and means for passing a current of electricity through the rods, each of the rods being made in two parts with supporting means at their meeting ends, and having yielding means for moving one of its parts endwise toward the other part.

7. The combination with a glass melting tank having a drawing extension or kiln with a cover extending over the surface of the kiln and provided with a drawing opening, of means for drawing a glass sheet upward through said opening, and means for heating the glass comprising a resistance rod spaced above the glass in the kiln below said cover on each side of said drawing opening, and means for passing a current of electricity through said rods.

8. The combination with a glass melting tank, of a drawing extension or kiln having walls of refractory material provided with passages, resistance rods extending through said passages, a refractory tube extending through the body of glass in the tank, a resistance rod extending through said tube, means for causing a flow of electric current through all of said rods, and means for drawing a sheet of glass upwardly from the kiln.

9. The combination with a glass melting tank, of a drawing extension or kiln having walls of refractory material provided with passages, resistance rods extending through said passages, a refractory tube extending through the body of glass in the tank, a resistance rod extending through said tube, a top for the kiln spaced above the surface of the glass and having a drawing opening, a resistance rod extending across the kiln between the glass and the top on each side of said drawing opening, and means for causing a flow of electric current through all of said rods.

In testimony whereof, I have hereunto subscribed my name this 18th day of July, 1925.

HARRY F. HITNER.